(No Model.) 4 Sheets—Sheet 1.

F. W. COY.
METHOD OF AND MEANS FOR MAKING HEEL STRIPS.

No. 357,552. Patented Feb. 8, 1887.

WITNESSES.
H. Brown
John Long

INVENTOR.
F. W. Coy
by Wright, Brown & Quinby
Attys.

(No Model.) 4 Sheets—Sheet 4.
F. W. COY.
METHOD OF AND MEANS FOR MAKING HEEL STRIPS.
No. 357,552. Patented Feb. 8, 1887.
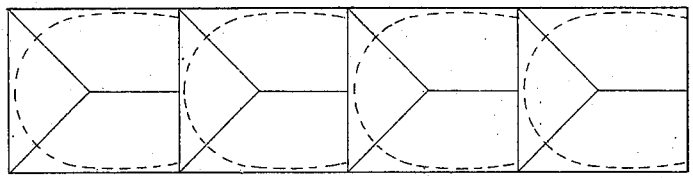
Fig. 4.
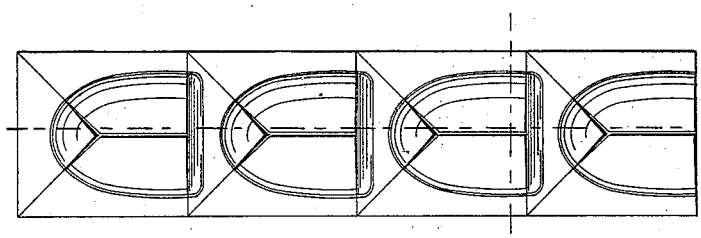
Fig. 5.
 
Fig. 6. Fig. 7.
 
Fig. 8. Fig. 9.
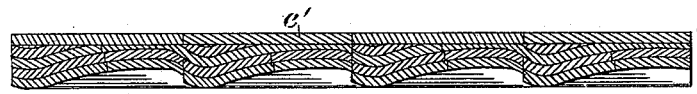
Fig. 10.
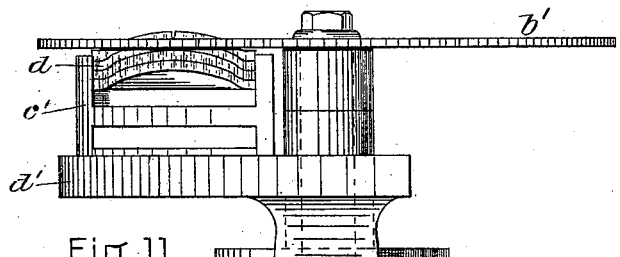
Fig. 11.
WITNESSES.
H. Brown
John Long
INVENTOR.
F. W. Coy
by Wight Brown & Crosley
Attys.

UNITED STATES PATENT OFFICE.

FREDERICK W. COY, OF BOSTON, MASSACHUSETTS, ASSIGNOR TO GEORGE H. P. FLAGG, TRUSTEE, OF SAME PLACE.

METHOD OF AND MEANS FOR MAKING HEEL-STRIPS.

SPECIFICATION forming part of Letters Patent No. 357,552, dated February 8, 1887.

Application filed July 6, 1886. Serial No. 207,169. (No model.)

*To all whom it may concern:*

Be it known that I, FREDERICK W. COY, of Boston, in the county of Suffolk and State of Massachusetts, have invented certain new and useful Improvements in the Method of and Means for Making Heel-Strips, of which the following is a specification.

This invention relates to boot and shoe heel-strips composed of a series of superposed layers, each of sufficient length for a series of heels, said layers or a part of them being composed of pieces, as shown in my Letters Patent of the United States for an improvement in heel-strip blanks, dated July 6, 1886, and numbered 345,122.

The present invention consists in the hereinafter-described method of making said heel-strips and in certain improved means for carrying said method into effect, all of which I will now proceed to describe and claim.

Figure 1:
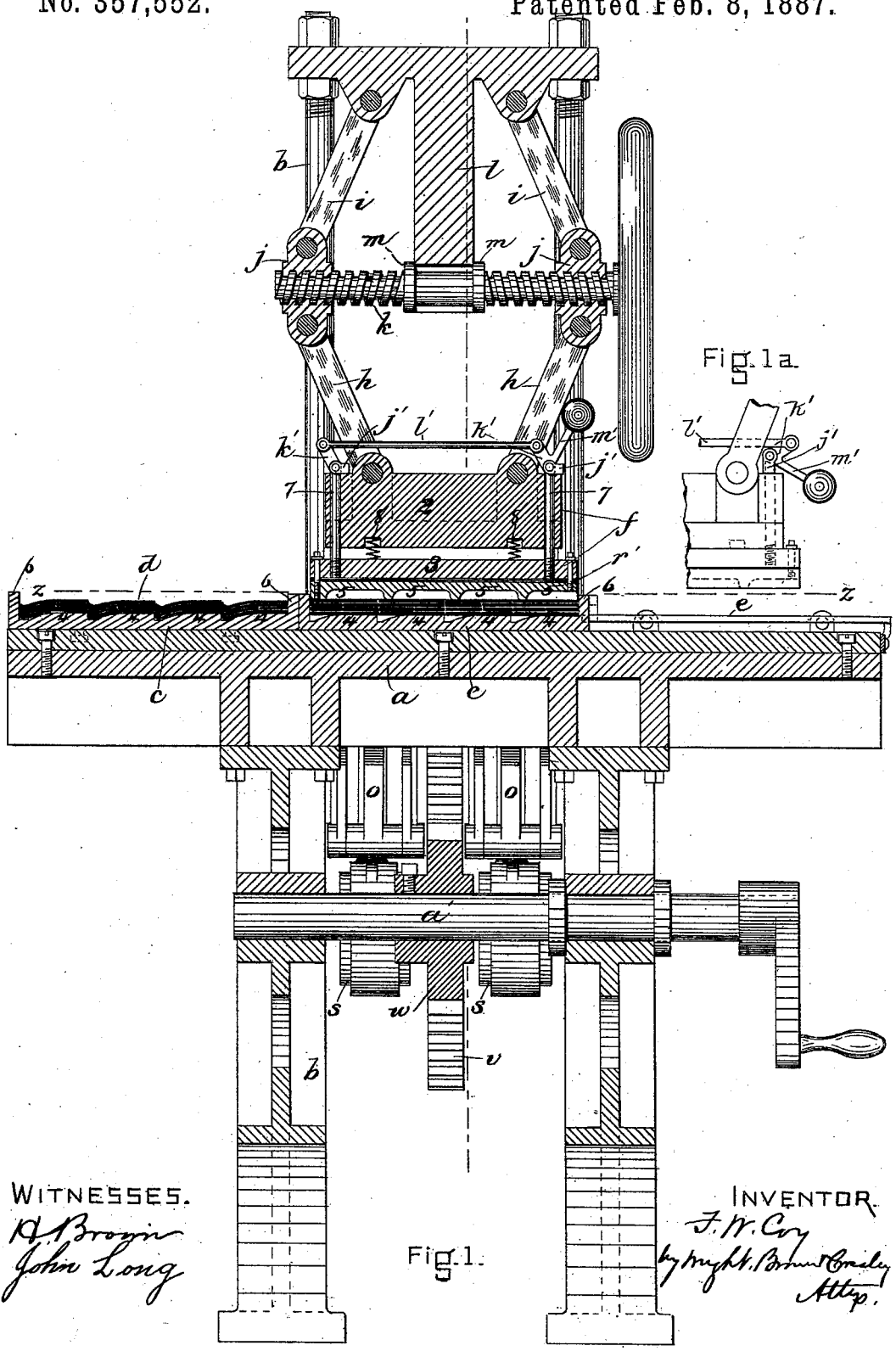
Figure 2:
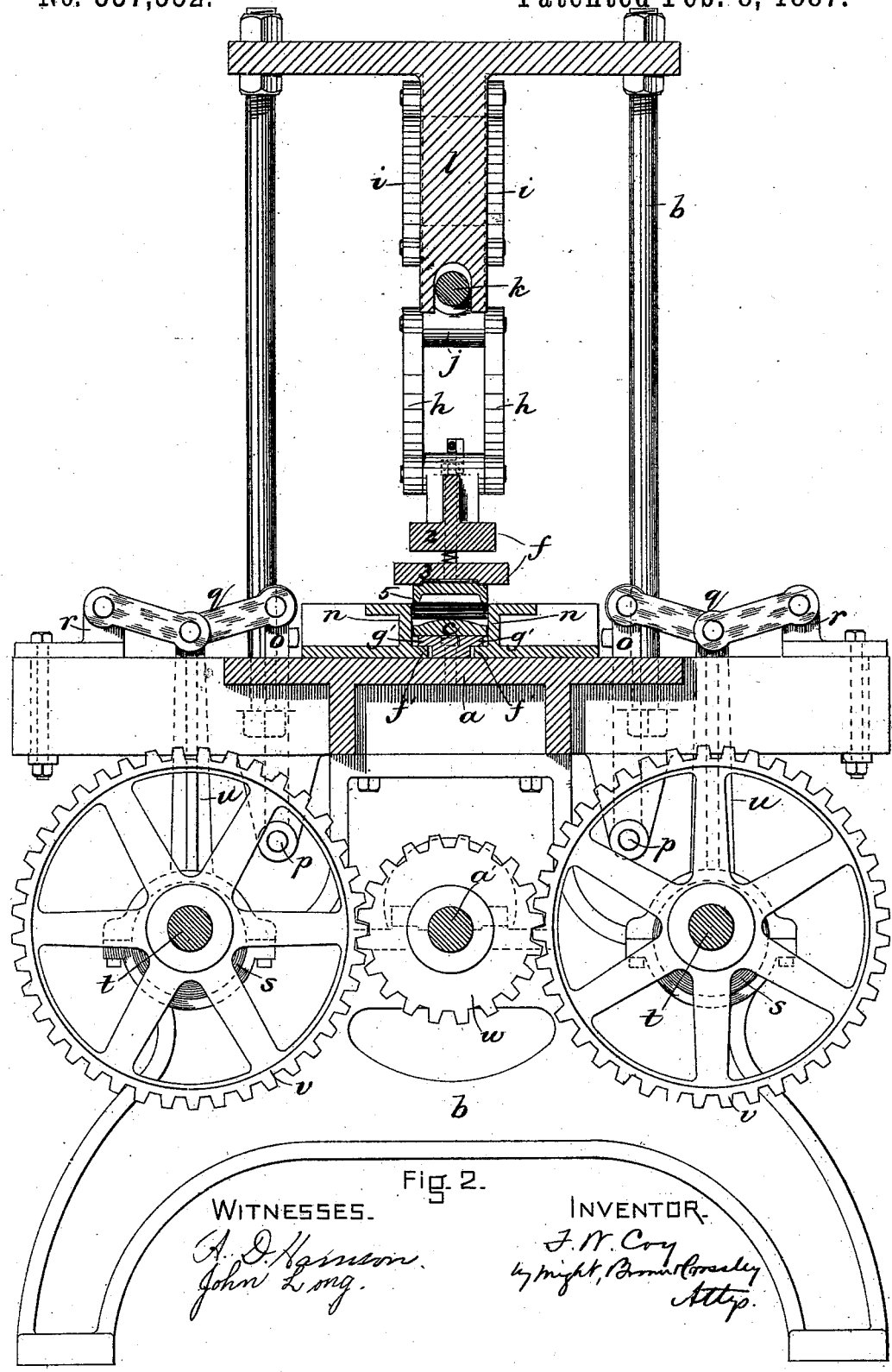
Figure 3:
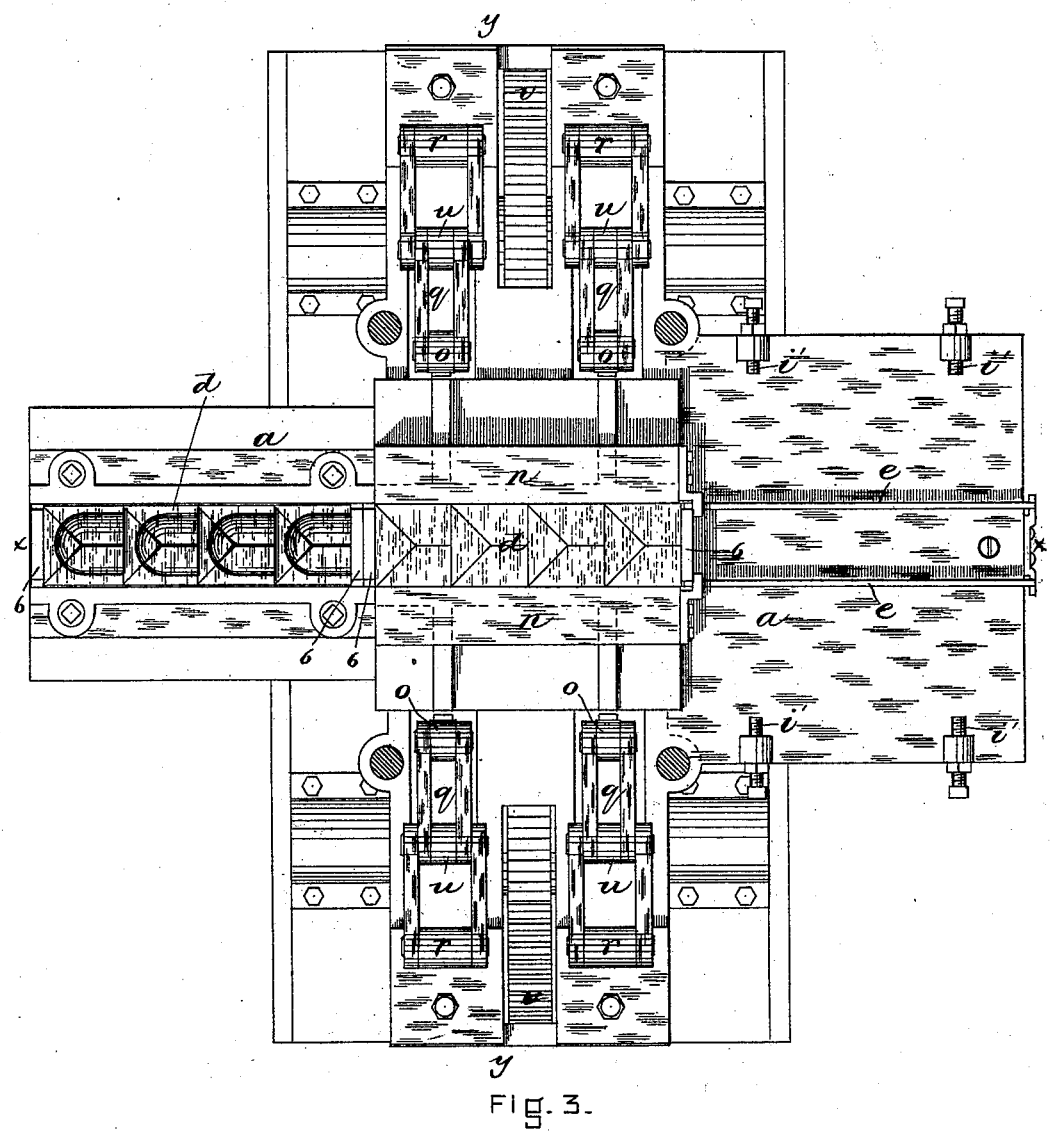

Of the accompanying drawings, forming a part of this specification, Figure 1 represents a vertical section of my improved machine on the plane of line $x\ x$, Fig. 3. Fig. 2 represents a vertical section on the plane of line $y\ y$, Fig. 3. Fig. 3 represents a plan view of the portion of the machine below the line $z\ z$, Fig. 1. Figs. 4 to 11, inclusive, represent views of the heel-strip, showing different stages of the operation of making it.

The same letters of reference indicate the same parts in all the figures.

In the drawings, $a$ represents a horizontal bed supported by a suitable frame-work, $b$. Said bed is of sufficient length to support a series of holders, $c\ c$, in which the pieces which are to comprise the heel-strip $d$ are assembled. Said holders are flat pieces, preferably of metal, each having a series of heel-shaped convex protuberances or dies, 4, on its upper side and two upwardly-projecting flanges or abutments, 6 6, one at each end. The holders are capable of sliding upon the bed, so that they can be brought successively under a platen or presser, $f$, which is supported by the upper portion of the frame $b$, and is provided with mechanism hereinafter described, whereby it may be forced downwardly to press and mold a heel-strip in a holder, $c$, placed beneath it.

The presser is composed of two parts, 2 3. The part 3 acts directly on the heel-strip and has its under surface provided with a series of projecting heel-shaped ribs or dies, 5, which are formed like the margin of a heel, and coincide with the correspondingly-formed recessed portions of the dies 4 on the holders $c$. The part 2 of the presser is directly connected with the devices which raise and depress it, and is connected with the part 3 by rods 7 7, Fig. 1, which are screwed into or otherwise attached to the part 3, and are adapted to slide in orifices formed for them in the part 2. The part 3 is therefore adapted to move vertically to a certain extent independently of the part 2, so that it may bear lightly or with a pressure due to its own weight and to springs 8 8, interposed between it and the part 2, on a heel-strip before the latter is pressed and molded, as shown in Fig. 1.

The presser is supported by toggle-links $h\ h$ $i\ i$ and nuts $j\ j$, pivoted to and connecting said links, as shown, the links $i\ i$ being pivoted at their upper ends to the upper portion of the frame $b$ and the links $h\ h$ at their lower ends to the part 2 of the presser. A right-and-left screw, $k$, works in the nuts $j\ j$, which are correspondingly threaded, and when turned in one direction forces the nuts toward each other and thus causes the links $h\ i$ to depress the presser, as will be readily seen.

The screw $k$ has a central unthreaded portion, which is contained in a slot in an arm, $l$, affixed to the frame $b$. Said arm and collars $m\ m$, formed on the screw and bearing against the arm, prevents the screw from endwise and sidewise displacement.

$n\ n$ represent side pressers, which are formed to bear against the edges of the heel-strips on the holder and compact the same edgewise, as hereinafter described. The side pressers are adapted to slide both lengthwise and sidewise upon the bed $a$, and mechanism is provided whereby they may be pressed simultaneously against the opposite edges of a heel-strip on a holder placed under the presser. Said mechanism is composed of four levers, $o\ o, o\ o$, arranged in pairs at opposite sides of the bed and pivoted at $p$ to arms or brackets on the frame $a$; toggle-joints $q\ q\ q\ q$, which are pivoted to the free ends of said levers and to brackets $r$, affixed to the frame a, as shown in Figs. 2 and 3; eccentrics s s on shafts t t, journaled in bearings in the lower portion of the frame a, and rods u u u u, engaged at their lower ends with said eccentrics, and pivoted at their upper ends to the meeting ends of the links of the toggle-joints q, as shown in Fig. 2.

The rotation of the shafts t t causes the eccentric-rods u to rise and fall, and thus through the toggle-joints q alternately move the side pressers, n n, inwardly and outwardly, their inward motion causing them to exert edgewise compression on the layers of the heel-strip between them.

The shafts t t are provided with gear-wheels v v, with which meshes a gear-wheel, w, on a driving-shaft, a', journaled in bearings in the frame a between the shafts t t.

In practicing the method constituting a part of my invention, I assemble a series of pieces of leather into a series of lifts or layers, each of sufficient length for several heels, said pieces being assembled upon a holder, c, which, for the time being, rests upon the right-hand end of the bed a at one side of the presser f. This end of the bed is made of sufficient width to support the side pressers, n n, which, as before stated, are capable of being moved upon the bed a. While the pieces are being assembled the side pressers are at opposite sides of the holder on which the pieces are being placed, and serve as guides to the operator in placing the pieces. Each piece is coated with glue or cement, and the pieces are preferably formed substantially as shown in my above-named pending application. When a sufficient number of pieces have been assembled to form a strip extending from one abutment 6 of the holder to the other abutment thereof, the holder is moved along under the presser f, and the part 3 of said presser is allowed to bear on the upper layer of the strip, as shown in Fig. 1, said part 3 holding the layers with sufficient pressure to prevent them from cockling up under the pressure of the side pressers, as hereinafter described, without exerting sufficient pressure on the strip to mold it. The side pressers are then brought into position beside the heel-strip thus held, and are pressed inwardly against the edges of said strip by the levers o o and the other mechanism cooperating therewith. The pieces are thus closely pressed together edgewise, and their joints are tightly closed, the form of the pieces being such that said pressure tightens all the joints—viz., those extending crosswise as well as those extending lengthwise of the strip—as described in my above-named application. The strip is slightly elongated by the side pressers, so that it entirely fills the space between the abutments 6 6. After the strip has been compressed, as described, by the side pressers, the top presser, f, is depressed to the fullest extent, and its heel-shaped dies 5 5 are thus caused to force the strip against the corresponding dies, 4, of the holder c, and thus form in the surface of the strip bearing on the holder c a series of concavities, each formed to fit the bottom of the heel of the human foot, so that when the strip is cut up into heels each heel will present a concave upper surface without the use of the usual rand. The last-described pressure is maintained until the glue or cement has hardened sufficiently to make permanent the form imparted to the strip, when the holder containing the molded strip is removed, and the above-described operation is repeated, another holder having an unmolded strip being substituted for the molded strip, and so on, each molded strip being removed to make room for another.

I prefer to make the bed a of sufficient length to support at least three holders—viz., one under the top presser and one at each end, as shown.

After each strip is molded it is subjected to the action of a suitable cutting device, which removes the protuberances at one side of the strip, leaving it with one side flat and the other side with a series of heel-supporting concavities.

I have here shown a circular saw, b', as the means for trimming the strip, (see Fig. 11;) but any other suitable cutting device may be employed. When a saw is used, the strip is supported by a suitable bed, c', and the quantity of material removed by the saw is determined by a gage, d', on said bed, which gage may be adjustable, if desired.

After the trimming operation one or more solid lifts, e', are glued to the flat side of the strips, and said lifts, or the outer one, when more than one are employed, may constitute the top lifts of the heels cut from the strip.

It will be understood that the completed strip is to be cut by suitable dies into heels, as indicated.

To prevent the side pressers from tipping upwardly when they are pressed against the strip, I provide them with flanges f'' f', which project under shoulders g' g', formed on a raised portion of the bed a, as shown in Fig. 2, said raised portion being provided for the purpose of holding down the pressers.

The portion of the bed on which the side pressers and the holder rest while the pieces are being assembled to form the strips are provided with screws i' i', working in tapped lugs on the bed, said screws constituting adjustable bearings for the side pressers, and holding them so that their inner edges will be at the proper distance apart to guide the operator in assembling the pieces.

To the upper ends of the rods 7 7, to which the part 3 of the top presser is attached, are pivoted short rock-shafts, to which are rigidly attached shorter arms, j' j', and longer arms, k' k', relatively arranged as shown in Fig. 1. The longer arms, k', are connected by a rod, l', and on one of said longer arms is formed an arm, m', having a weight.

When the part 3 of the presser is separated from the part 2, as shown in Fig. 1, the sides of the shorter arms, $j'$, bear upon the top of the part 2, and when by the continued downward movement of the part 2 the two parts 2 3 are brought together, as in exerting the molding-pressure on the strip, the rods 7 7 are pushed upwardly and the weight on the arm $m'$ causes the rock-shafts to turn, so that the shorter arms, $j'$ $j'$, stand vertically and their ends bear on the upper surface of the part 2, as shown in Fig. 1ª. The part 3 is thus locked, so that it cannot be separated from the part 2 until the operator raises the weighted arm $m'$. The object of this is to keep the part 3 elevated out of the way while the holder $c$ and the unmolded strip thereon is being moved to place under the top presser. When the strip is moved to place, the operator, by raising the weighted arm $m'$, allows the part 3 to bear on the strip with a comparatively light pressure, as above described, while the side pressers are acting. The part 2 of the top presser is then depressed by the described mechanism until it bears on the part 3 and presses the latter downwardly with sufficient force to mold the strip, as already described.

The mechanism whereby the pressers are operated may be actuated by hand or by power, and in the latter case the operation may be automatic.

The top presser and each holder may be of any desired length. They are here shown as of sufficient length to form a strip containing four heels.

To prevent undue strain on the mechanism which operates the top presser, in case the heel-strip under pressure exceeds the average thickness, I make the part 3 of the top presser in two sections and interpose between them a sheet of rubber, $r'$, as shown in Fig. 1, or, if preferred, a spring or springs of metal having sufficient elasticity to yield and prevent injury from the cause above named.

Instead of the use of cement, the strips of leather may be secured together by any of the well-known means. For instance, they may be connected together by wire stitching, the latter being sufficiently pliable to yield with the strips when they are subjected to pressure.

My invention is not limited to the details of construction hereinbefore described, as the same may be variously modified without departing from the spirit of the invention.

I prefer to place rods $e$ $e$ on the holder $c$ when the latter is in the position it occupies while the pieces are being assembled upon it, said rods lying at each side of the protuberances or dies 4 4 of said holder, and forming a support for the pieces, so that they will not tilt on said protuberances. The rods should be detachably secured to the bed $a$, so that when the slide is moved forward under the top presser it will leave the rods so that they will not interfere with the subsequent molding operation.

I claim—

1. The improved method of making a continuous series of heels, the same consisting in assembling and securing pieces of leather in a series of lifts or layers of sufficient length for a series of heels, exerting pressure on the edges of said lifts, and molding the strip between dies acting on the upper and lower sides of the strip, as set forth.

2. The improved method of making a continuous series of heels, the same consisting in assembling and securing pieces of leather in a series of lifts or layers of sufficient length for a series of heels, then exerting a holding-pressure on the top of the strip thus constituted, then exerting pressure on the edges of the strip, and finally molding the strip between dies acting on its upper and lower sides, as set forth.

3. The improved method of making a continuous series of heels, the same consisting in assembling pieces of leather in a series of lifts or layers of sufficient length for a series of heels, molding the strip so as to form in one side a series of heel-supporting cavities and on the opposite side a corresponding series of protuberances, trimming off said protuberances to form a flat side, and applying one or more flat lifts to the trimmed side, as set forth.

4. In a machine for making heel-strips, the combination of a supporting-bed, one or more movable holders, $c$ $c$, adapted to slide thereon and to hold a strip composed of a series of pieced lifts or layers, side pressers, $n$ $n$, and means for operating them, whereby pressure is applied against the edges of said strip, means, such as part 3, for exerting a holding-down pressure on the strip while said side pressers are acting, and means, such as part 2, for pressing the lifts together and thereby reducing the thickness of the strip, as set forth.

5. In a machine for making a continuous series of heels, the combination of the bed, the holder $c$, having the end abutments, 6 6, the top presser, $f$, having the part 3, adapted to exert a holding-down pressure on a strip on the holder, and the side pressers, $n$ $n$, and mechanism, substantially as described, to operate them, as set forth.

6. In a machine for making a continuous series of heels, the combination of the supporting-bed, a strip-holder, $c$, having a series of dies, 4, on its upper surface, the top presser, $f$, having a series of dies, 5, on its under surface, formed, as described, to co-operate with the dies of the holder, and means for operating said presser, as set forth.

7. In a machine for making a continuous series of heels, the combination of the supporting-bed, a strip-holder having a series of dies on its upper surface, the top presser composed of the parts 2 3, the latter being movable independently of the former and provided with a series of dies on its lower surface, the side pressers and mechanism to operate them, and means, substantially as described, whereby when the part 2 of the top presser is depressed the part 3 is locked to it, as set forth.

8. The top presser composed of the parts 2 and 3, combined with the rods 7 7, secured to the part 3 and adapted to slide in the part 2, the arms $j'$ $j'$ and $k'$ $k'$, pivoted to the upper ends of said rods, the connecting-rod $l'$, and the weighted arm $m'$, all arranged and operating substantially as described.

9. The combination of the bed having the raised shouldered portion and the side pressers having flanges $f'$, formed to engage the shoulders on said raised portion, as set forth.

In testimony whereof I have signed my name to this specification, in the presence of two subscribing witnesses, this 3d day of July, 1886.

FREDERICK W. COY.

Witnesses:
C. F. BROWN,
A. D. HARRISON.